US 8,839,780 B1

(12) United States Patent
Bennett et al.

(10) Patent No.: US 8,839,780 B1
(45) Date of Patent: Sep. 23, 2014

(54) GAS GRILL WITH SIDE OVEN

(71) Applicant: W.C. Bradley Co., Columbus, GA (US)

(72) Inventors: Christopher J. Bennett, Opelika, AL (US); Thomas W. E. Gooch, IV, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 0 days.

(21) Appl. No.: 13/727,966

(22) Filed: Dec. 27, 2012

Related U.S. Application Data

(60) Provisional application No. 61/586,174, filed on Jan. 13, 2012.

(51) Int. Cl.
*A47J 37/00* (2006.01)
*A47J 37/07* (2006.01)

(52) U.S. Cl.
CPC ................................. *A47J 37/0713* (2013.01)
USPC .......... 126/25 R; 126/1 A; 126/16; 126/19 R; 126/21 R; 126/276

(58) Field of Classification Search
USPC ............... 126/25 R, 1 A, 16, 19 R, 21 R, 276
See application file for complete search history.

(56) References Cited

U.S. PATENT DOCUMENTS

| 3,783,854 A | * | 1/1974 | Hurko et al. | 126/21 R |
| RE29,602 E | * | 4/1978 | Perl | 126/21 A |
| 8,381,712 B1 | * | 2/2013 | Simms, II | 126/25 R |
| 2008/0098902 A1 | * | 5/2008 | Mansfield et al. | 99/339 |

* cited by examiner

*Primary Examiner* — Kenneth Rinehart
*Assistant Examiner* — Gajanan M Prabhu
(74) *Attorney, Agent, or Firm* — Fellers, Snider, Blankenship, Bailey & Tippens, P.C.; David G. Woodral

(57) ABSTRACT

An outdoor cooking grill assembly having a side gas oven which is positioned at substantially the same elevation as the grill and preferably also includes a gas burner assembly of the same type used in the grill.

9 Claims, 5 Drawing Sheets

GAS GRILL WITH SIDE OVEN

This application claims the benefit of U.S. Provisional Patent Application Ser. No. 61/586,174 filed on Jan. 13, 2012 and incorporates said provisional application by reference into this document as if fully set out at this point.

FIELD OF THE INVENTION

The present invention relates generally to outdoor gas cooking grills.

BACKGROUND OF THE INVENTION

Outdoor gas grills have been in use since the 1970's. A conventional gas grill will typically comprise: a lower housing structure which houses an open topped firebox; at least one burner which is positioned in a lower portion of the firebox; a cooking grate or other food support structure positioned within or near the top opening of the firebox such that the food support grate is above the burner element(s); and a lid which is rotatably connected to the lower housing structure such that the lid can be pivoted between an open position and a closed position for opening and closing the grill.

The grill housing will typically be mounted on top of a frame or cart having wheels, rollers, or casters for moving the grill assembly from one location to another. Many grill carts comprise enclosed frame structures having doors on the front thereof such that the cart forms a cabinet for holding the gas fuel canister and for storing other items.

Some attempts have been made heretofore to market gas grill assemblies which have also included a baking oven. In these prior art assemblies, the baking oven has been located substantially at the bottom of the grill cart below the lower grill housing structure. The prior art combination gas grill and baking oven assembly has thus resembled a conventional indoor home oven wherein a stovetop is provided on top of the oven chamber.

Unfortunately, due in part to the significant differences between outdoor grilling versus indoor cooking, the combination gas grill and oven assemblies heretofore known in the art have had significant shortcomings and deficiencies. One deficiency of the prior art grill and oven assembly has been that the user must bend, stoop, or squat, essentially to ground level, in order to place food items in and remove food items from the oven chamber. In addition, the positioning of the oven chamber below the grill firebox housing can interfere to some degree with the user's access to the bottom of the firebox housing, and may require some additional structural modification to the firebox housing so that, for example, fat drippings from the food products can be adequately captured and removed. Further, the very limited space between the bottom of the oven and the ground or a bottom panel of the cart affects the type and height of the burner which can be used, not only in terms of space available, but also in terms of providing sufficient combustion air flow.

Moreover, and perhaps most significantly, a further significant shortcoming of the prior art combination gas grill and oven assembly has to do with the location of the grill burner(s) and oven burner(s) at significantly different elevations. The gas burner(s) for the oven must be mounted beneath the oven chamber and are therefore located only a few inches above ground level. The gas burner(s) for the grill firebox, on the other hand, are located at a much higher elevation at, or more typically above, the top of the grill cart. Consequently, in order to provide gas flow to both the elevated grill burner(s) and to the lower oven burner(s), the gas supply system which delivers the gas fuel from the gas canister and the pressure regulator to both sets of burners is required to be much longer, more complex, and more expensive than the typical gas delivery system used for conventional gas grills which do not include baking ovens.

In addition, all of the combined deficiencies and shortcomings of the prior art combination gas grill and oven assembly discussed above also make the prior art assembly more difficult to inspect, less reliable, and less safe.

SUMMARY OF THE INVENTION

The present invention provides a combination gas grill and side oven assembly which satisfies the needs and alleviates the problems discussed above.

In one aspect, there is provided an outdoor cooking grill assembly comprising: a cart, frame, or other support structure; a grill firebox housing mounted at the upper end of the cart, frame, or other support structure; a lid for opening and closing the grill firebox housing; one or more gas burner elements installed within a lower portion of the firebox housing; a cooking grate or other food support structure mountable at or near the upper opening of the grill firebox above the burner element(s); and a gas operated side oven assembly having a cooking chamber.

The grill firebox housing has a front side, a rear side, and two opposite lateral sides. The side oven assembly is mounted adjacent to one of the lateral sides of the grill firebox housing, preferably at an elevation such that at least a portion of the oven cooking chamber will be positioned above the upper opening of the grill firebox. The side oven assembly will more preferably be positioned at an elevation such that most of the oven cooking chamber is above the elevation of the upper opening of the firebox and will most preferably be secured at an elevation such that substantially the entire oven cooking chamber is above the elevation of the upper opening of the grill firebox.

As will be apparent, the inventive combination gas grill and gas side oven system provides much more convenient and much safer access to the gas oven and greatly enhances the user's ability to perform grilling and baking operations at substantially the same time. In addition, the gas burner element(s) for the inventive oven is/are located at an elevation which will preferably be at least close to the elevation of the grill burner element(s) so that the complexity of the gas supply system for the inventive combination grill and side oven assembly is greatly reduced. In fact, the burner element(s) for the inventive side oven will preferably be at the same or substantially the same elevation as the grill burner element(s), and can even be substantially the same type of burner element(s) used in the grill firebox, such that in some cases, any added complexity required for the gas delivery system of the inventive combination grill and oven assembly would not be significantly greater than would be required to simply add another burner element to the grill firebox.

Further aspects, features, objectives, and benefits of the inventive apparatus and system will be apparent to those of ordinary skill in the art upon examining the accompanying drawings and upon reading the following detailed description of the preferred embodiments.

DETAILED DESCRIPTION OF THE PREFERRED EMBODIMENTS

Figure 1:
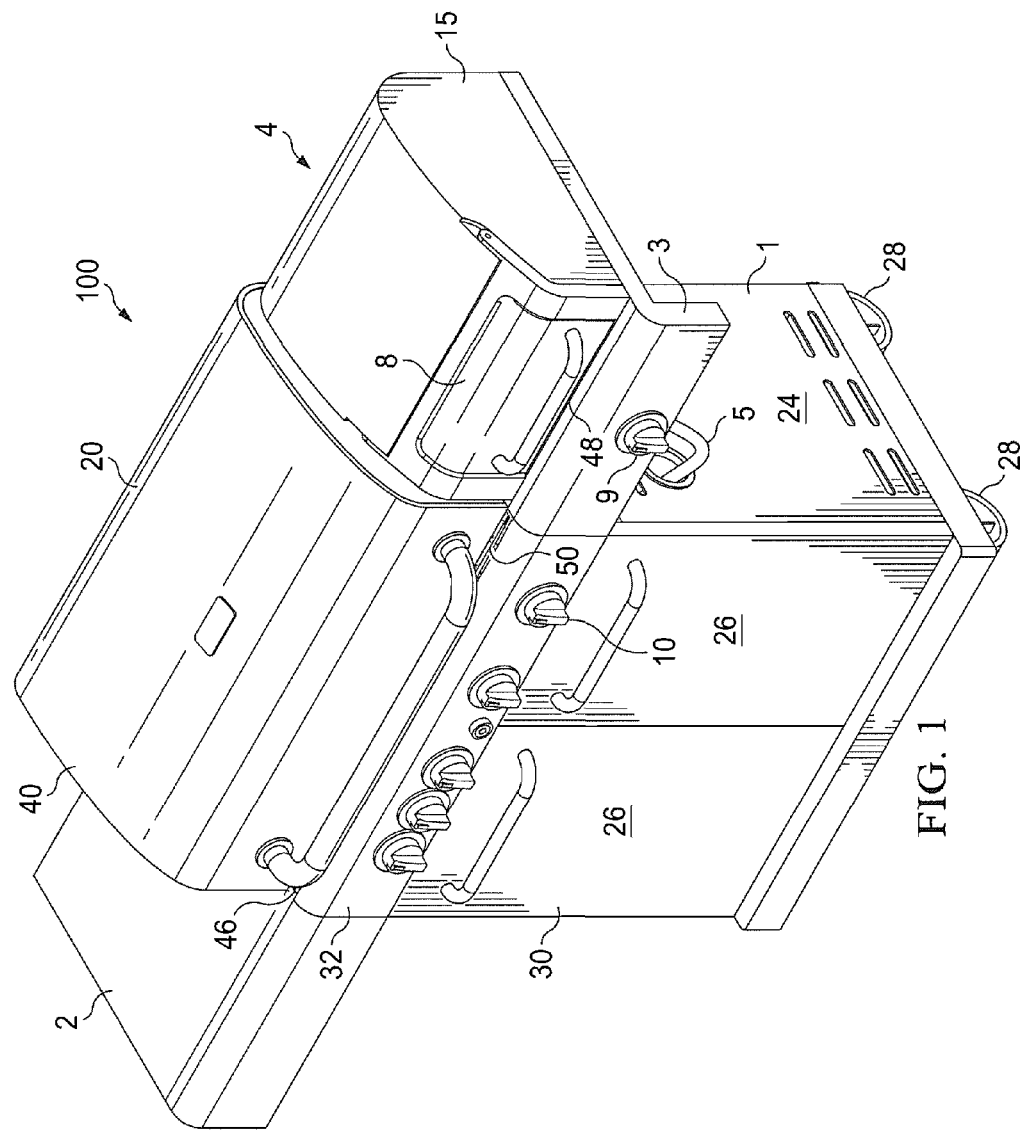
FIG. 1 is a front perspective view of an embodiment 100 of the inventive combination grill and side oven apparatus.
Figure 2:
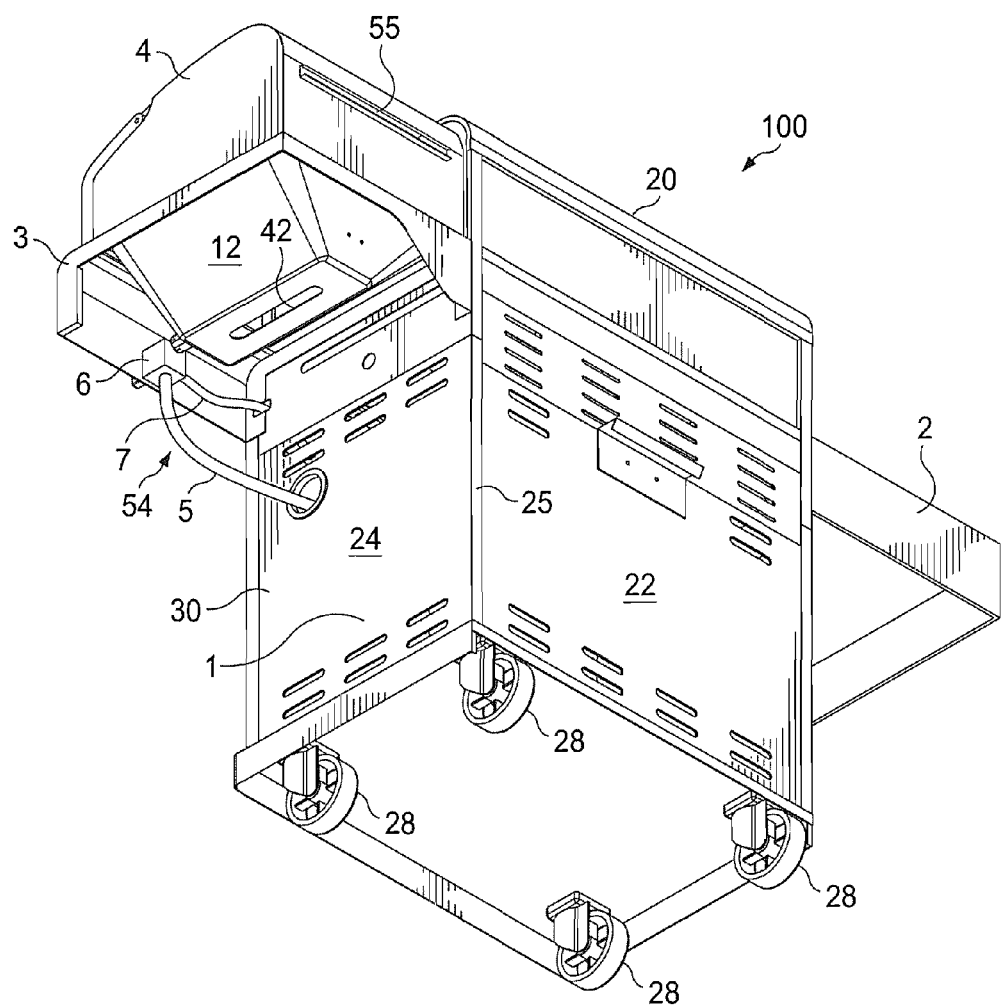
FIG. 2 is a perspective rear view of the inventive grill and side oven assembly 100.

An embodiment 100 of the inventive combination grill and side oven apparatus is illustrated in FIGS. 1-5. The inventive grill and side oven assembly 100 comprises: a grill cart 1; a grill housing and lid assembly 20 mounted on top of the grill cart 1; an oven side shelf 3 secured to and extending from either the right or the left lateral side of the housing and lid assembly 20 or the grill cart 1; an embodiment 4 of the inventive side oven assembly mounted on the oven side shelf 3 adjacent to the right or left lateral side of the grill housing and lid assembly 20; and a regular utility shelf 2 secured to and extending from the grill assembly 20 or the grill cart 1 adjacent to the other lateral side of the grill housing and lid assembly 20.

The grill cart 1 is preferably an enclosed grill cart comprising a frame 25 having back and side panels 22 and 24 attached thereto to form a cabinet 30 having front cabinet doors 26. The grill cart 1 preferably has wheels, rollers or casters 28 on the bottom thereof for moving the inventive assembly 100 from place to place. As it is typical with cart assemblies of this nature, the fuel canister (not shown) for supplying gas fuel to the grill and to the inventive side oven assembly 4 will be housed within the cart cabinet 30.

Figure 5:
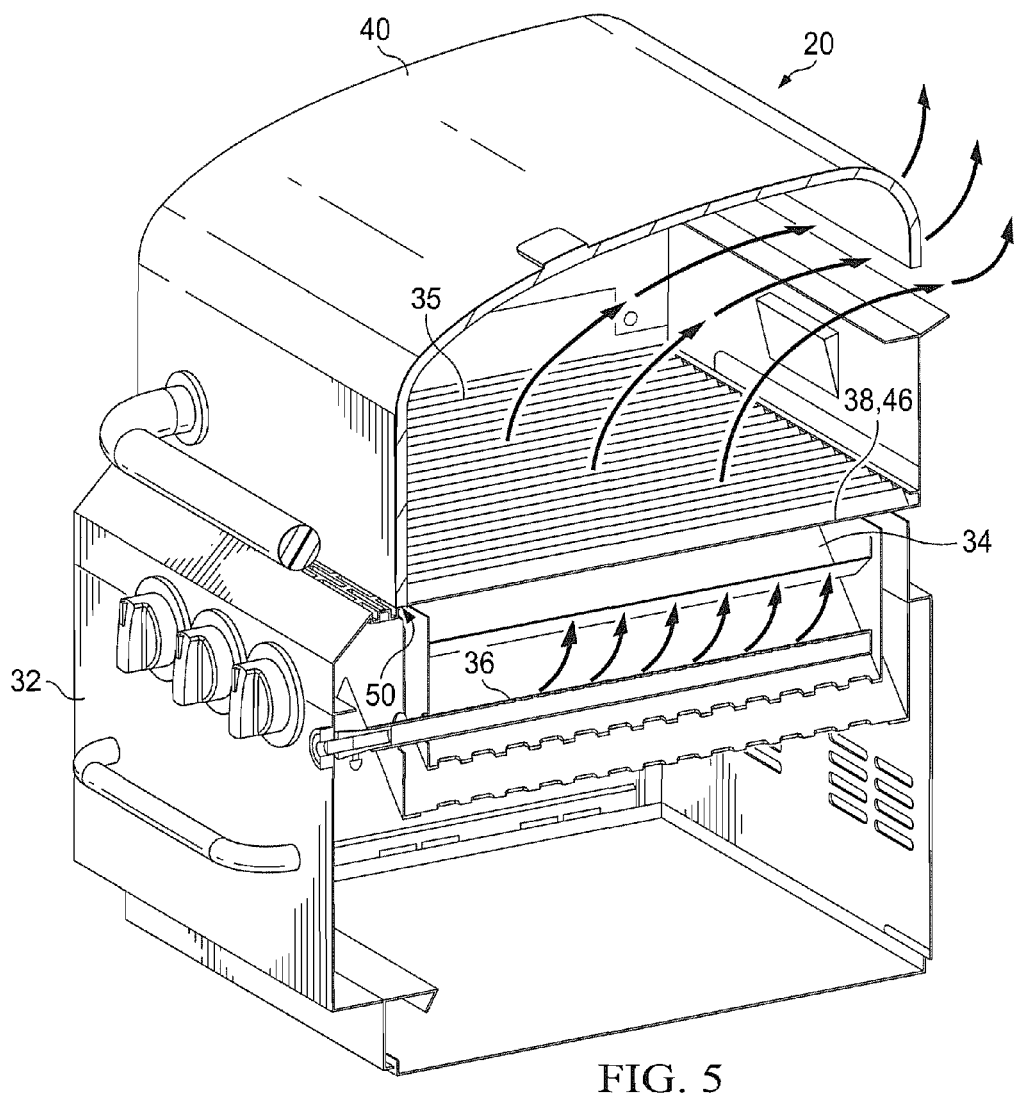
FIG. 5 is a cutaway side perspective view of an example of a typical grill housing and lid assembly 20 which can be used in the inventive apparatus 100.

The grill housing and lid assembly 20 used in the inventive apparatus 100 can generally be any type of cart or frame mountable grill housing and lid assembly known in the art. An example of a suitable grill housing and lid assembly 20 is illustrated in FIG. 5. The grill housing and lid assembly 20 comprises: a lower firebox housing structure 32 having an upwardly facing firebox 34 therein; one or more burner element(s) 36 installed in a lower portion of the firebox 34; a cooking grate or other food support structure 35 removably positionable in or proximate to an upper opening 38 of the firebox 34; and a lid 40 which is pivotably connected to the firebox housing structure 32 for opening and closing the upper opening 38 of the firebox 34.

The inventive side oven assembly 4 preferably comprises: a burner housing 12 which is retained by the oven side shelf 3 and has a secondary air opening 42 in the bottom thereof; a gas burner element 11 which extends into the burner housing 12 and will be controlled by an oven burner control knob 9 on the front panel of the oven side shelf 3; a burner heat distribution plate 13 positioned over the burner housing 12; an oven cooking chamber housing 15 supported on the oven side shelf 3; a food support rack 16 removably positionable in the cooking chamber 45, the oven cooking chamber 45 being contained within and defined by the oven housing 15; and an oven door 8 pivotably attached to the oven housing 15 for opening and closing the front opening of the cooking chamber 45.

The oven side shelf 3 and the oven assembly 4 are preferably secured on and extend from the right or left lateral side of the lower firebox housing structure 32 or the grill cart 1 at an elevation such that at least a portion of the cooking chamber 45 and the oven door 8 will be above the elevation 46 of the upper opening 38 of the firebox 34. More preferably, the inventive side oven assembly 4 will be secured in a position adjacent to the right or left lateral side of the grill housing and lid assembly 20 at an elevation such that at least most of the cooking chamber 45 and the oven door 8 will be located above the elevation 46 of the upper opening 38 of the firebox 34. Most preferably, the oven side shelf 3 and the inventive side oven assembly 4 will be secured to the lower firebox housing structure 32 or the grill cart 1 on the right or left lateral side of the grill housing and lid assembly 20 such that (a) substantially all of the oven cooking chamber 45 is above the elevation 46 of the grill firebox opening 38, (b) the oven gas control knob 9 for the side oven burner 11 will be at substantially the same elevation as the gas controlled knob(s) 10 of the grill 20 and (c) the bottom 48 of the oven door 8, when closed, will be at substantially the same elevation as the bottom front edge 50 of the grill lid 40.

Because the gas burner(s) 11 for the side oven 4 can be located close to or at the same elevation as the gas burner(s) 36 of the grill 20, the gas supply system 54 of the inventive combination grill and oven apparatus 100 is much simpler than the gas supply system required in prior art combination grill and oven assembly and is much easier to assemble, inspect, and service, as well as being less costly to produce and easier to access. The gas supply system 54 comprises a main gas hose or line 5 which extends from the tank and pressure regulator (not shown) inside the grill cart 1 and a valve 6 secured inside the front panel of the oven side shelf 3. The valve 6 splits the gas flow as necessary so that a portion of the gas flow is delivered from valve 6 to the oven burner element(s) 11 and the remainder of the gas flow travels through a secondary gas hose or line 7 from the valve 6 to the grill burner(s) 36.

Figure 3:
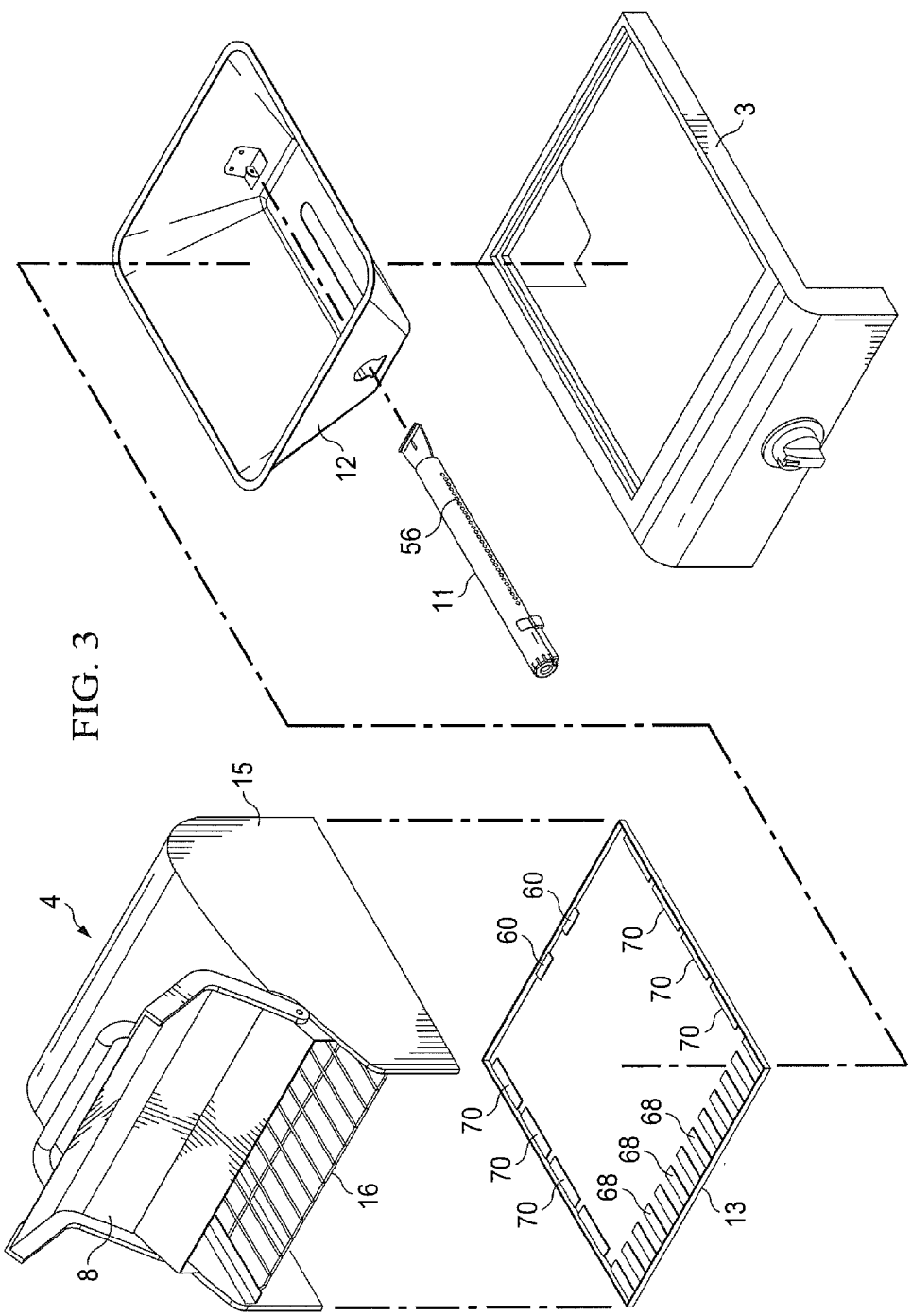
FIG. 3 is an exploded perspective view of an embodiment 4 of the inventive side oven assembly used in the inventive grill 100.
Figure 4:
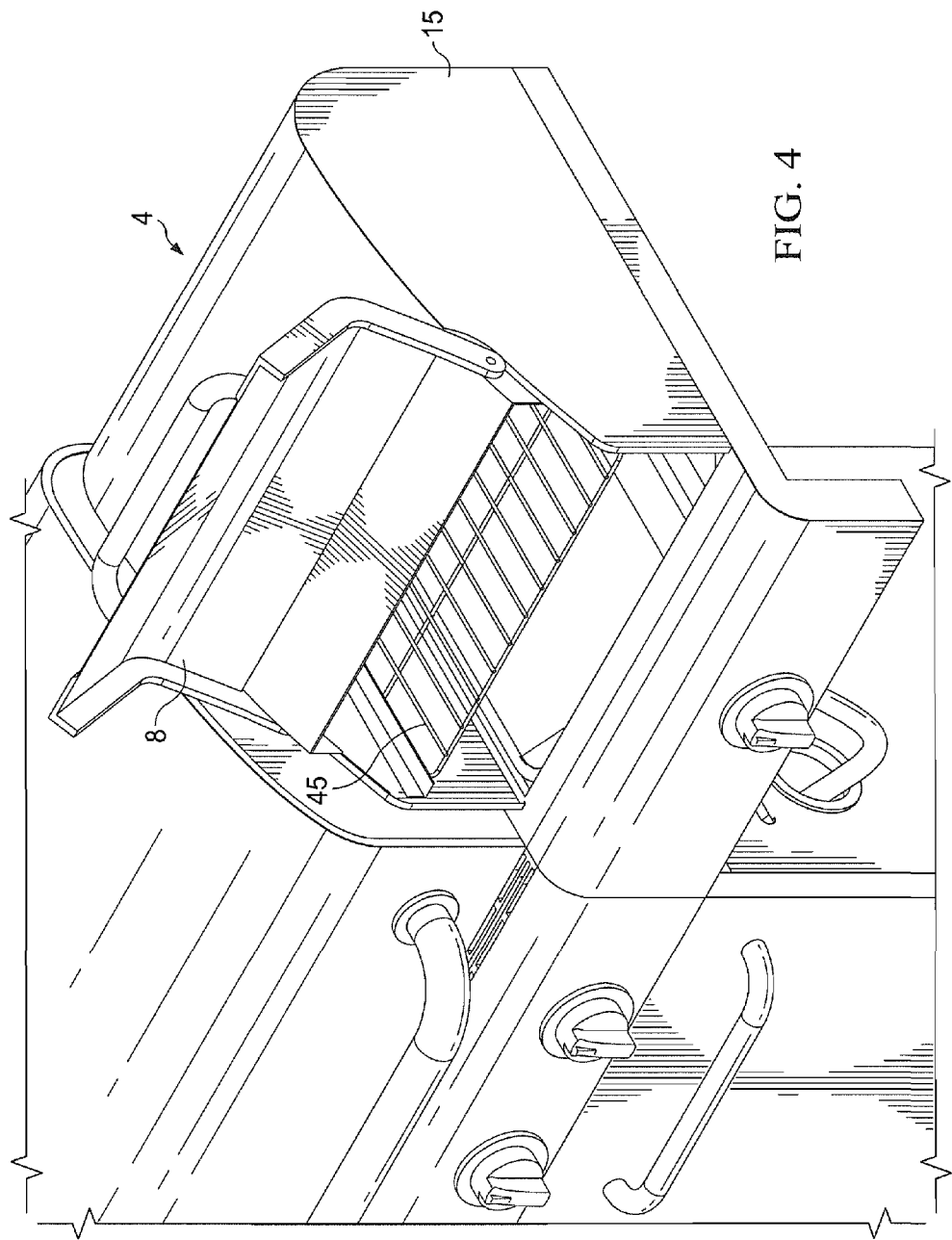
FIG. 4 is a front perspective view of the inventive side oven assembly 4 with the oven door 8 in open position.

It will also be understood that, although the oven burner element 11 shown in FIG. 3 is a tube burner element which (a) has two rows of gas discharge ports 56 extending along opposite sides of the burner element 11 and (b) is installed in a burner housing having upwardly diverging side walls, other types of burners (e.g., pan burners) and/or other types of burner housings (e.g., box-shaped housings) could alternatively be used in the side oven assembly 4.

In the inventive side oven assembly 4, because an upper exhaust vent 55 is provided in the back of the oven housing 15, the heat distribution plate 13 preferably directs the burner flue gas to the front and sides of the oven chamber 45, thus providing better flue gas flow and distribution throughout the oven chamber 45. To provide this flow pattern, the center of the plate 13 preferably has no openings therethrough for flue gas flow, while the rear of the plate 13 preferably has only small openings 60 which allow a minimal amount of hot flue gas to pass therethrough in order to balance the temperature of the chamber from front to back. The front and lateral sides of the plate 13 have multiple larger slots or other openings 68 and 70 therein through which the majority of the flue gas will travel. In addition, the center of plate 13 is heated by the flue gas and radiates heat toward the oven chamber 45. The heat distribution plate 13 will preferably be formed of 430 stainless steel.

In the inventive side oven assembly 4, the heat distribution plate 13 will preferably be positioned from about 2.5 to about 4 inches, more preferably about 3¼ inches above the burner element 11. The spacing of the heat distribution plate above the burner element 11 will preferably be such as to allow sufficient mixing of the flue gas and any excess secondary air so that a more uniform temperature of the hot gas entering the bottom of the oven cooking chamber 45 is achieved. The spacing also prevents flame impingement on the heat distribution plate 13 and thus additionally promotes flames stability and prevents flame failure and/or incomplete combustion.

The food support rack 16 in the oven chamber 45 is preferably positioned at from about 2¾ to about 5½ inches, more preferably 4¼ inches, above the heat distribution plate 13. This spacing allows for further beneficial mixing of the chamber air with the flue gases.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. An outdoor cooking grill assembly comprising:
   a support structure;
   a grill firebox housing supported by the support structure, said grill firebox housing having an upper opening;
   a grill lid positionable over said upper opening of the grill firebox housing for opening and closing said upper opening;
   at least one gas burner assembly positioned in said grill firebox housing; and
   a gas baking oven positioned adjacent to a left or right lateral side of said grill firebox housing, said gas baking oven comprising an oven housing having a cooking chamber therein;
   wherein:
      said gas burner assembly is positioned in said grill firebox housing at an elevation;
      said gas baking oven includes a gas burner assembly;
      said gas burner assembly of said gas baking oven is mounted at an elevation which is substantially the same as said elevation of said gas burner assembly positioned in said grill firebox housing; and
      said gas burner assembly of said gas baking oven is substantially identical to said gas burner assembly positioned in said grill firebox housing.

2. The outdoor cooking grill assembly of claim 1 wherein:
   the upper opening of said grill firebox housing is positioned at an elevation and
   said gas baking oven is elevationally positioned such that at least a portion of said cooking chamber of said gas baking oven is above said elevation of said upper opening of said grill firebox housing.

3. The outdoor cooking grill assembly of claim 2 wherein said gas baking oven is elevationally positioned such that at least most of said cooking chamber of said gas baking oven is above said elevation of said upper opening of the grill firebox housing.

4. The outdoor cooking grill assembly of claim 2 wherein said gas baking oven is elevationally positioned such that substantially all of said cooking chamber of said gas baking oven is above said elevation of said upper opening of said grill firebox housing.

5. The outdoor cooking grill assembly of claim 1 further comprising a food support grate which is removably positionable substantially at said upper opening of said grill firebox housing.

6. The outdoor cooking grill assembly of claim 1 wherein:
   said gas baking oven has a front oven door on said oven housing for opening and closing said cooking chamber, said front oven door having a bottom edge;
   said grill lid has a front bottom edge; and
   when said front oven door and said grill lid are closed, said bottom edge of said front oven door and said front bottom edge of said grill lid are positioned at substantially the same elevation.

7. The outdoor cooking grill assembly of claim 1 wherein:
   said gas burner assembly of said gas baking oven comprises a burner housing having an upper opening which is in fluid communication with a bottom of said oven housing; and
   said gas burner assembly of said gas baking oven further comprises a gas burner element positioned in said burner housing.

8. The outdoor cooking grill assembly of claim 7 wherein:
   said oven housing of said gas baking oven has an upper back exhaust opening and
   said gas baking oven further comprises a heat distribution plate positioned above said upper opening of said burner housing.

9. An outdoor cooking grill assembly comprising:
   a support structure;
   a grill firebox housing supported by the support structure, said grill firebox housing having an upper opening;
   a grill lid positionable over said upper opening of the grill firebox housing for opening and closing said upper opening;
   at least one gas burner assembly positioned in said grill firebox housing; and
   a gas baking oven positioned adjacent to a left or right lateral side of said grill firebox housing, said gas baking oven comprising an oven housing having a cooking chamber therein;
   wherein:
      said gas baking oven includes a gas burner assembly;
      said gas burner assembly of said gas baking oven comprises a burner housing having an upper opening which is in fluid communication with a bottom of said oven housing;
      said gas burner assembly of said gas baking oven further comprises a gas burner element positioned in said burner housing;
      said oven housing of said gas baking oven has an upper back exhaust opening and
      said gas baking oven further comprises a heat distribution plate positioned above said upper opening of said burner housing; and
   wherein said heat distribution plate has a substantially solid central portion and wherein peripheral air flow openings are provided through front, back, left side, and right side peripheral portions of said heat distribution plate such that a greater total air flow area is provided through each of said left side, right side, and front peripheral portions of said heat distribution plate than is provided through said back peripheral portion of said heat distribution plate.

* * * * *